Patented Feb. 24, 1953

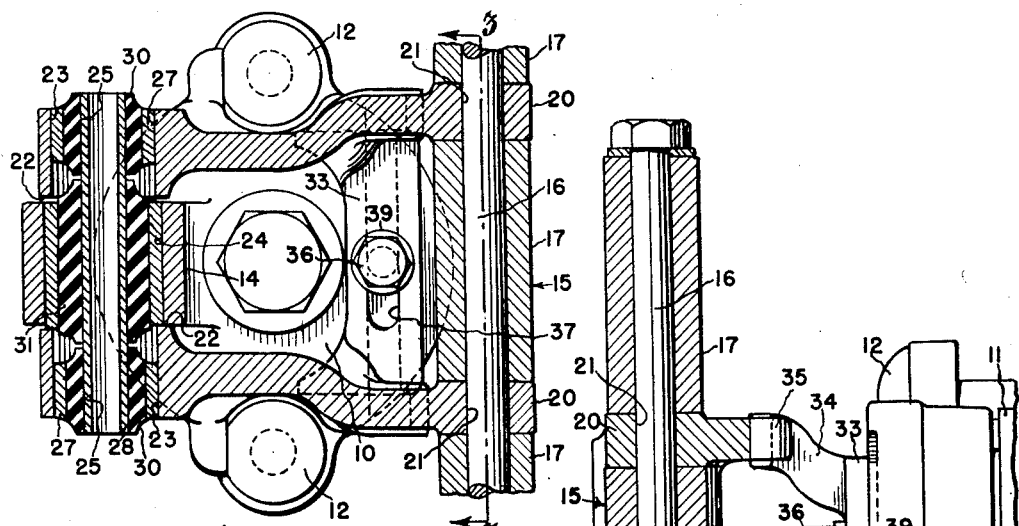
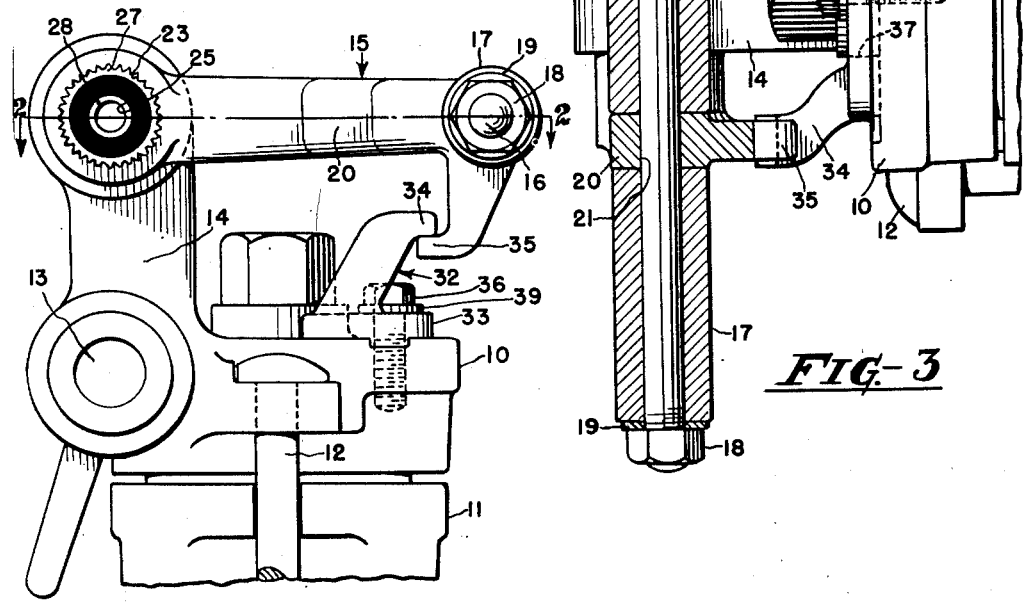

2,629,364

UNITED STATES PATENT OFFICE 2,629,364

VIBRATION ABSORBING HANDLE FOR ROCK DRILLS

James H. Anderson, Easton, Pa., assignor to Ingersoll-Rand Company, New York, N. Y., a corporation of New Jersey Application June 16, 1950, Serial No. 168,515

7 Claims. (Cl. 121—36)

This invention relates to rock drills, and more particularly to devices for absorbing the vibration resulting from the operation of rock drills of the hand-held type.

The work of operating a percussive tool is very fatiguing because the vibrations set up by the tool are transmitted to the operator through the handle. As a consequence, the amount of work a man can do decreases materially the longer he operates the tool. If the operator could be isolated from the tool's vibration he would then be protected from the fatigue caused by such vibration.

It is, accordingly, an object of this invention to isolate the operator from the vibrations set up by the tool.

Another object of this invention is to construct a device to absorb the vibration normally transmitted to the handle.

Other objects will be in part obvious and in part pointed out hereinafter.

In the drawings in which identical reference numerals refer to similar parts,

Figure 1 is a side elevation showing a portion of a percussive tool constructed in accordance with the practice of this invention, Figure 2 is a sectional view taken along the line 2—2 in Figure 1 looking in the direction of the arrows, and Figure 3 is a sectional view taken along the line 3—3 in Figure 2 looking in the direction of the arrows.

Referring now to the drawings for a detailed description of the invention, 10 designates the back head portion of a percussive tool. The back head 10 is joined to the cylinder barrel 11 (partly shown) by a pair of bolts 12 and is provided with a valve 13 to throttle the supply of motive fluid to the tool. In accordance with the practice of this invention the back head 10 is further provided with a projection 14 which serves as a pivot post for the handle assembly 15 of the tool.

The hand-gripped portion of the handle assembly 15 is formed by a long bolt 16 having cylindrical sections 17 mounted thereon. A pair of lever arms 20, having bores 21 at one end to receive the bolt 16, are positioned on the bolt 16 intermediately of the sections 17 and connect the hand-gripped portion of the handle assembly 15 with the pivot post 14. Accordingly, the lever arms 20 are spaced on the bolt 16 so that the inner side surfaces 22 of the lever arms lie on opposite sides of the pivot post 14. The cylindrical sections 17 and lever arms 20 are locked on the bolt 16 by a nut 18 and washer 19 threaded onto one end of the bolt 16.

The lever arms 20 are joined to the pivot post 14 by a torsional coupling which preferably takes the form shown in the drawings in which each of the lever arms 20 is each provided with a bore 23 having a series of serrations in its periphery. A similarly serrated bore 24 is also provided in the pivot post 14, and when the lever arms 20 are positioned alongside the pivot post the bore therein is in concentric alignment with the bores 23 in the lever arms 20.

Rubber liners 30—31 are inserted into the bores 23 of the lever arms 20 and into the bore 24 of the pivot post 14; the liners in the lever arms being designated by the numeral 30 and the liner in the pivot post by the numeral 31. Bonded to the outer surface of the liners 30—31 are bushings 27 having their outer surfaces serrated to match the serrated bores 23 in the lever arms 20 and the pivot post 14. When the liners 30 and 31 and bushings 27 are inserted into the bores 23 and 24 the serrated bushings 27 interlock with the serrations in the bores to fixedly position the outer surfaces of the liners 30—31 with respect to the lever arms 20 and pivot post 14.

For the purpose of joining the lever arms 20 to the pivot post 14 the liners 30—31 are each provided with a central bore 25 into which a rod 28 is inserted and bonded to the inner surface thereof. Each of the end portions of the rod 28 is joined to a liner 30 in a lever arm while the central portion of the rod 28 is joined to the liner 31 in the pivot post 14. The rod 28 thus provides a means for transmitting torque from one liner to another.

In the normal operation of the invention the handle assembly is held in working position, as shown in the drawings, by the operator. The valve 13 is opened to admit fluid to the actuating mechanism (not shown) of the tool to cause the tool to operate. Operation of the tool causes vibrations which result in axial thrusts of the tool casing 11 and pivot post 14. Since the hand-gripped portion of the handle assembly 15 is held by the operator the lever arms 20 pivot about the pivot post 14 thereby producing a torque on the liners 30—31.

The outer surfaces of the liners 30 rotate with the lever arms 20 while the inner surfaces are rotated to a lesser extent causing the liners 30 to twist or deflect torsionally. At the same time the rod 28 rotates with the inner surfaces of the liners 30 and since it is bonded to the inner surface of the liner 31 in the pivot post causes this inner surface to rotate to the same extent. Rotation of this surface causes the liner 31 to twist or deflect torsionally because the outer surfaces are fixedly positioned in the pivot post 14. Thus, by the manner set forth, is the vibration of the tool absorbed in the torsional deflection of the liners 30—31.

By employing liners in both the lever arms and the pivot post the applicant achieves a construction which is very effective in absorbing vibration because by placing a large liner in the pivot post in series with two smaller liners in the lever arms the effective spring length is doubled over that of a construction employing only one liner. The deflection for a given load is also doubled and this greater deflection results in more effective isolation of the vibration from the handle of the tool.

In order to obtain effective absorption of the tool's vibration it is desirable to have the liners pre-stressed to a value approximating the range of values encountered when the tool is in operation. For this purpose the lever arms 20 are mounted on the outer liner bushings 27 in a position other than the normal operating position. The lever arms 20 are then rotated in a clockwise direction in the drawing to the normal operating position in which the liners 30—31 will have been twisted to an extent to place the liners 30—31 under a stress approximating those stresses to be encountered in operating the tool. It will be readily seen that the serrations on the bushings 27 and in the bores 23 of the lever arms 20 allow the lever arms to be mounted on the bushings in any position necessary to obtain the desired amount of stress in the liner.

A mechanism 32 is provided on the back head 10 for holding the handle assembly 15 in the normal operating position and comprises a hooking member 33 slidably mounted on the back head 10 and having hooks 34 projecting upwardly and outwardly from the member 33 for engagement with hooks 35 depending from the lever arms 20. The hooking member 33 is secured to the back head 10 by means of a screw 36 projecting through a slot 37 in the member 33. A washer 39 on the screw 36 fastens the hooking member 33 to the back head 10. Whenever it is desired to release the handle assembly 15 the screw 36 is loosened to allow the hooking member 33 to be slidably moved out of engagement with the hooks 35 depending from the lever arms 20.

I claim:

1. A handle for a percussive tool having a casing, comprising a hand-gripped portion, a lever arm for the hand-gripped portion, a resilient member on the lever arm, a resilient member on the casing, and a connection between the resilient members for transmitting torque from one member to the other member.

2. A handle for a percussive tool having a casing, comprising a hand-gripped portion, a lever arm for the hand-gripped portion, a resilient member carried by the lever arm, a resilient member carried by the casing, means for preventing rotary movement of the members with respect to the lever arm and the casing, and a connection between the members for transmitting torque from one member to another.

3. A handle for a percussive tool having a casing, comprising a hand-gripped portion, a lever arm on the hand-gripped portion, a resilient member twistably secured to the lever arm, a resilient member twistably secured to the casing, and a connection between the resilient members for transmitting torque from one member to another.

4. A handle for a percussive tool having a casing, comprising a hand-gripped portion, a lever arm on the hand-gripped portion having a bore, a resilient liner in the bore in the lever arm, a bore in the casing, a resilient liner in the last-mentioned bore, means for preventing rotation of the liners in the bores of the casing and the lever arm, and a connection between the resilient liners secured thereto, said connection being rotatable with respect to the lever arm and casing.

5. A handle for a percussive tool having a casing, comprising a hand-gripping portion, a pair of lever arms fastened to the hand-gripped portion, a bore in each of the lever arms, a projection on the casing adapted to extend between the pair of lever arms and having a bore in coaxial alignment with the bores in the lever arms, rubber liners in all of the bores, means for preventing rotation of the liners in the bores, and a rod extending into the liners and being securely joined thereto to transmit torque from one liner to another.

6. A handle for a percussive tool having a casing, comprising a hand-gripped portion, a pair of lever arms fastened to the hand-gripped portion, a bore in each of the lever arms, a projection on the casing adapted to extend between the pair of lever arms and having a bore in coaxial alignment with the bore in the lever arms, bushings selectively and interlockingly positioned in all of the bores, rubber liners in the bushings, and a rod extending into the liners and securely joined thereto to transmit torque from one liner to another.

7. A handle for a percussive tool having a casing, comprising a hand-gripped portion, a lever arm fastened to the hand-gripped portion, a bore in the lever arm having a plurality of serrations in the periphery of the bore, a bore in the casing having a plurality of serrations in the periphery of the bore, bushings having serrated outer surfaces selectively and interlockingly positioned in the bores, rubber torsion levers bonded to the inner surfaces of the bushings, and a rod bonded to the inner surfaces of the rubber liners for joining the torsion liners and transmitting torque from one liner to the other.

JAMES H. ANDERSON.

REFERENCES CITED

The following references are of record in the file of this patent:

UNITED STATES PATENTS

| Number | Name | Date |
| --- | --- | --- |
| 2,062,817 | Noble | Dec. 1, 1936 |
| 2,101,869 | Noble | Dec. 14, 1937 |

FOREIGN PATENTS

| Number | Country | Date |
| --- | --- | --- |
| 122,752 | Austria | May 11, 1931 |